Sept. 2, 1952          R. BLAFIELD          2,609,067

HYDRAULIC BRAKE SYSTEM

Filed March 14, 1950          2 SHEETS—SHEET 1

INVENTOR
ROY BLAFIELD,

BY Munn, Liddy & Glaccum
ATTORNEYS

Sept. 2, 1952  R. BLAFIELD  2,609,067
HYDRAULIC BRAKE SYSTEM
Filed March 14, 1950  2 SHEETS—SHEET 2

INVENTOR
ROY BLAFIELD,

BY Munn, Liddy & Glaccum
ATTORNEYS

Patented Sept. 2, 1952

2,609,067

UNITED STATES PATENT OFFICE 2,609,067

HYDRAULIC BRAKE SYSTEM

Roy Blafield, Newport News, Va.

Application March 14, 1950, Serial No. 149,543

4 Claims. (Cl. 188—152)

The present invention relates to hydraulic brake systems for automotive vehicles and more particularly to a dual cylinder brake system where one of the cylinders distributes the fluid to the front wheels and the other cylinder distributes fluid to the rear wheels.

It is a primary object of this invention to furnish a brake system, as described above, which may be so arranged that either one of the cylinders will operate the front and back wheels should the other of the cylinders become defective.

Another object of the invention is to provide a brake system whereby in the event one of the brake lines leading to either the front or rear sets of wheels becomes broken, the other set will continue to function.

Still another object of the present invention is to provide a pressure responsive means for actuating a signaling device should the pressure in either of the above described brake lines drop below a predetermined level.

The invention furthers contemplates the use of bypass means so that should one of the dual cylinders fail to function properly, it will not interfere with the functioning of the other cylinder.

Still further objects and advantages will become apparent from the following description of the present invention illustrated in the accompanying drawing, in which.

Similar reference characters represent similar parts in the several figures.

The present invention has been designed to add many safety features to the hydraulic brake systems for automotive vehicles. At the present time the system on such vehicles are of a single flow variety. That is, one cylinder operates as a master and distributes fluid to the various wheels for actuating pistons which operate the brake shoes. Should a break occur in any of the lines a pressure drop will occur in the other three lines, thereby resulting in failure of the whole system. Such failures are very common and often result in serious accidents. Many times what would be mere minor accidents often become very serious by a brake failure.

This can best be illustrated, for example, where a vehicle should strike a glancing blow on another vehicle, such blow resulting in the breaking of a fluid line running to the wheel closest to where the blow is struck. Immediately the vehicle is out of control, resulting in serious damage to the vehicle and loss of life. This invention contemplates separating these lines into front and back pairs and providing a separate master cylinder for each pair of lines. In this manner, should a break occur in one of the lines at least two of the wheels will continue to have a braking function. Further, control means are provided so that in the event of a break in the line or a loss of fluid into one of the brake drums, this line may be shut out of the system and the vehicle will continue to operate with two wheel brakes until a repair shop is reached.

A signaling means has been provided which is actuated by a pressure responsive means in the line of each of the master cylinders. By testing the brakes before starting or moving the vehicle, defects in the lines may be found which will put the operator on notice that one of the cylinders is not functioning properly. Also, in the event the quantity of fluid in the lines and reservoir is too low, this may also be detected.

One of the further causes of failure of the brake system is in piston or cylinder failure. Many times the master cylinder piston washer, after due time, wears away and causes the fluid to bypass the washer in question. Therefore, compression of liquid in the system cannot be maintained when the foot pedal is depressed. With the present invention such a failure would immediately come to the knowledge of the operator and could be quickly remedied.

Figure 1:
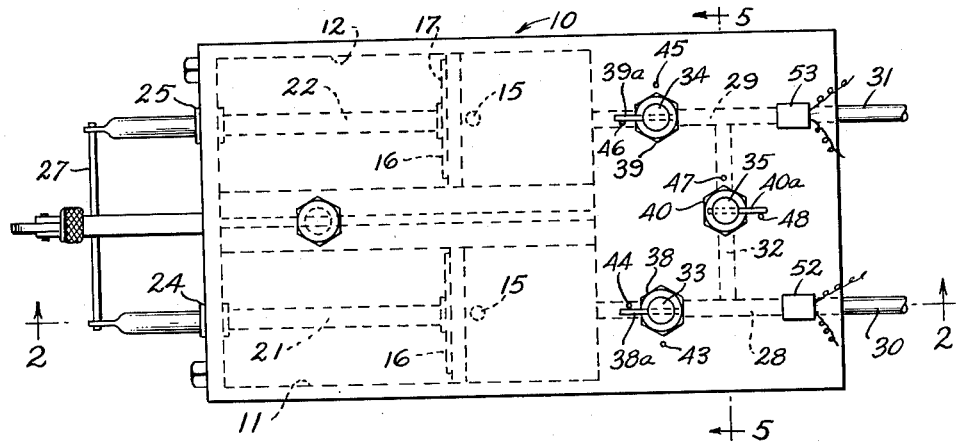
Figure 1 is a plan view of the present invention showing various parts in dotted line.
Figure 2:
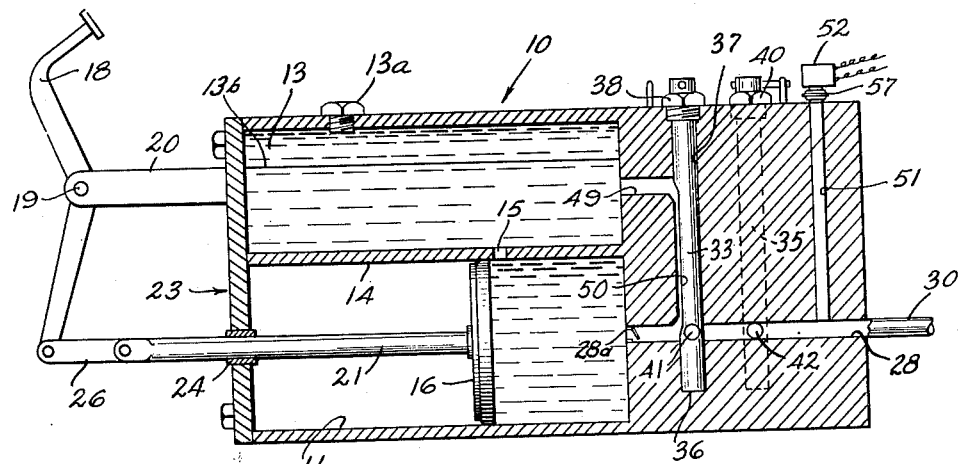
Figure 2 is a sectional view taken on line 2—2 of Fig. 1.
Figure 3:
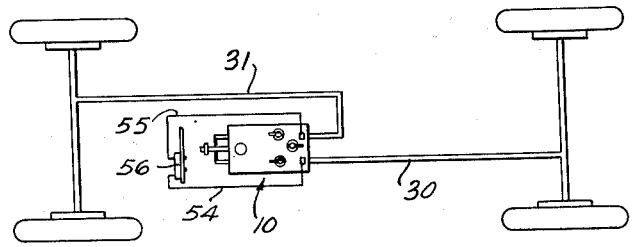
Figure 3 is a diagrammatic plan of the brake system as used in an automotive vericle.
Figure 4:
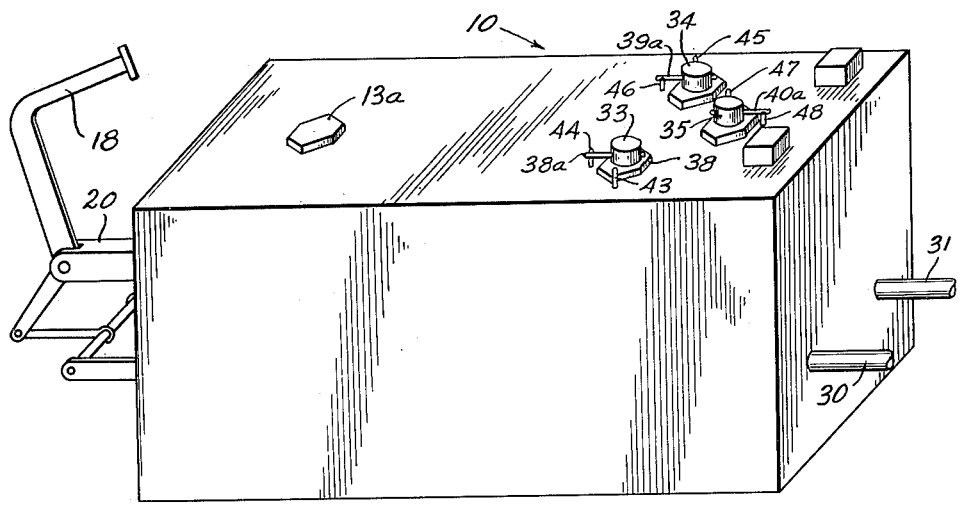
Figure 4 is a perspective view of the device showing the control knobs and operating pedal.
Figures 5, 6:
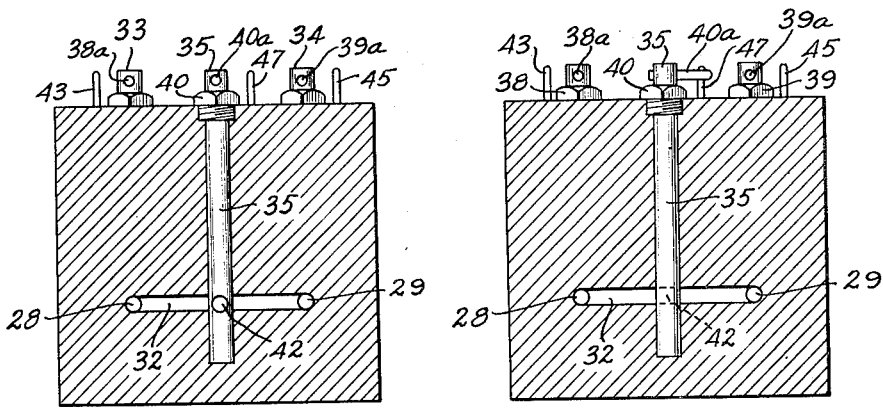
Figure 5 is a sectional view taken on line 5—5 of Fig. 1, showing the valve in a closed position.
Figure 6 is a sectional view of the device taken on line 5—5 of Fig. 1, showing the valve in an open position.

The main portion of the device comprises a block 10 having dual pressure generating means therein including a pair of cylinders 11 and 12. These cylinders are arranged in the lower portion of the block and each is of the usual hydraulic type. Directly over each of the cylinders a reservoir is provided and, as seen in Fig. 2, is illustrated by the numeral 13. A filler plug 13a is provided in the top wall of the reservoir so that in the event of a fluid leak in any of the lines the reservoir may be refilled after the defect has been rectified. A wall 13b is provided in the reservoir intermediate the two cylinders. The wall is approximately two-thirds the height of reservoir 13 and extends longitudinally thereof. The reason for this wall is that in the case of a break in one of the fluid lines resulting in draining of the fluid therefrom the complete reservoir will not be drained. In view of the fact that each of the cylinders 11 and 12 is the same in construction it is deemed that a description of one will be sufficient.

Between the reservoir 13 and the cylinder 14, a port 15 is furnished for interconnection between the cylinder and the reservoir. Cylinders 11 and 12 are provided with pistons 16 and 17, respectively, each having a leather washer to prevent leakage around the piston. For operating each of the pistons the brake pedal 18 is operatively connected thereto, the linkage including a bell crank lever which is pivotally mounted, as at 19, to a forwardly extending member 20, the latter being mounted on the forward end of the main block 10. Piston rods 21 and 22 are secured to the pistons 16 and 17, respectively, and extending through the forward end of the block, illustrated by the numeral 23, in bearing members 24 and 25, respectively. The forward end of each of the piston rods is connected by a transverse rod 27 and an intermediate link 26 is provided to pivotally connect the lower end of the brake pedal bell crank and the transverse rod, the latter connection being midway of the end of the rod.

Rearwardly of each of the cylinders in the main block 10 passages 28 and 29 are provided, these passages providing communication between the rear wheel distributing line 30 and the front wheel distributing line 31, respectively, and the master cylinders 11 and 12, respectively. Conventional relief valves are furnished in each of the passages, one of which is illustrated by the numeral 28b. Passages 28 and 29 are inter-connected intermediate their ends by a crossover passage 32. Passages 28, 29 and 32 are controlled respectively by vertically extending valves including valve stems 33, 34 and 35. These stems are adapted to rotate in vertical passages in the block. These vertical passages extend from the lower end portion of the block past each of the horizontal passages to the upper surface of the block. As will be seen from Fig. 2 the passage receiving the valve stem 33 has a lower end wall, illustrated by the numeral 36, and extends up through the passage 28. From the latter passage to the upper surface of the block, or to the open end of the passage, a wall 37 surrounds the valve stem. Securing the valve stems in position, bolts 38, 39 and 40 are provided, and are adapted to surround each of the stems, there being appropriate packing glands between the stems and the bolts. A control arm is provided for each of the aforementioned stems as illustrated by the numerals 38a, 39a and 40a. In the lower portion of each of the valve stems horizontally extending apertures are provided so that when the stem is in a certain position fluid is allowed to flow through the passages and in another position the flow of fluid is cut off from the passages. These apertures are illustrated by the numeral 41 in stem 33 and the numeral 42 in the stem 35. In the upper surface of the block adjacent the outer end of the stem controlling arms, vertically extending posts are provided, being arranged so as to provide a stop means allowing 90° rotation of each stem. The stops or posts for stem 33 are illustrated by the numerals 43 and 44, those for stem 34 being illustrated by the numerals 45 and 46 and the stop means for stem 35 being illustrated by the numerals 47 and 48. By allowing each of the stems to rotate through 90° it will be seen that the flow of fluid in each passage can be cut fully on or fully off.

In order that one of the dual cylinders can operate should the other of the cylinders become inoperative, or should it become necessary to close either of the passages 28 or 29, a bypass has been provided for connecting the reservoir 13 and the passages 28 and 29. As seen in Fig. 2, the bypass comprises a horizontal passage 49 in the block and a vertical passage 50 in valve stem 33. Therefore, it will be seen that in the event the stem 33 should be positioned so as to close the passage 28, as shown in Fig. 2, the fluid going into the passage 28 from the cylinder 11 is allowed to flow up through the passage 50 and the horizontal passage 49 back into the reservoir.

A second pair of vertical passages are provided in the horizontal passages 28 and 29, one of which is illustrated by the numeral 51 in Fig. 2. Circuit closing devices 52 and 53 are mounted at the upper end of the passages and they are adapted to be electrically connected by means of wires 54 and 55 respectively, to indicating lights on the dash, as illustrated by the numeral 56. It will be seen that a diaphragm 57 is adapted to receive pressure impulses from the system. That is, when the pressure in the system rises the diaphragm is actuated to thereby close the circuit and operate one of the lights on the dash 56.

To summarize the operation of the present invention it will be but necessary to determine where a defect in the system occurs and the manner in which to isolate this break from the system. For example, should piston 16 fail to operate it would be but necessary to turn the stem 33 to its closed position, turn the stem 35 to its open position and then cylinder 17 could operate the brake drums of all of the wheels until the defective cylinder is repaired.

In the event one of the pistons should fail, for example piston 16, the force of pressure in the line 30 and in the passage 28 would fall so that when the brake pedal is pressed downwardly the diaphragm 57 would not function and the light on the dash would fail to operate. Depending on which one of the lights fails to operate the driver could then tell which part of the system to isolate. In the event line 30 should break the light would similarly fail to operate and it would then be necessary to close the stem 33 and leave the cross-over stem 35 in its closed position. In this manner the cylinder 12 will still control the front wheels and thus braking service is provided until the line can be repaired. Of course, in the event of such line failure the circuit of the signal means 52 would be open. Therefore, the light on the panel would not operate, which would be the signal that one of the pairs of wheels had no braking effect.

It will be seen that I have provided a novel braking system for vehicles having many inherent advantages making for added safety on the roads. The device can easily be adapted to the automobile or truck with only small change being necessary. This system is capable of many variations of use so that in the event of a partial failure, the rest of the system may still operate.

While I have shown and described a preferred form of my invention, it will be understood that variations in details of form may be made without departure from the invention as defined in the appended claims.

I claim:

1. In a brake system for vehicles having pairs of front and rear brakes, a main block having dual pressure generating means positioned therein and means forming a reservoir, a communicating passage in said block leading from one of said pressure generating means to a fluid line connected to the rear pair of wheel brakes, a second passage in said block leading from the other of said pressure generating means to a fluid line connected to the front pair of wheel brakes, a bypass leading from each of said passages to said reservoir, valve means positioned in each of said bypasses and its respective passage, said valve means controlling the flow of fluid through each bypass and its respective passage and being so constructed that if the passage is closed the bypass will be open and if the passage is open the bypass will be closed, and a cross-over control means for selectively operating both of said pairs of wheel brakes from a single one of said generating means.

2. In a brake system for vehicles having front and rear sets of wheel brakes, separate fluid pressure generating means for each set of brakes, a fluid reservoir for supplying fluid to each of said pressure generating means, means controlling the flow of fluid from each of said pressure generating means to its respective set of brakes, a bypass between each of the pressure generating means and said reservoir so arranged that in the event either of said fluid control means is closed the fluid will return to the reservoir, and a cross-over control means for selectively operating both sets of front and rear brakes from a single one of said generating means.

3. In a brake system for vehicles having pairs of front and rear wheel brakes, dual pressure generating means, a fluid reservoir for supplying fluid to each of said pressure generating means, a fluid line leading from one of said generating means to said front pair of brakes and a second fluid line leading from the other of said generating means to said rear pair of brakes, valve means inserted in each of said fluid lines for controlling the flow of fluid from each pressure generating means to its respective set of brakes, a bypass interconnecting each of said pressure generating means and said reservoir, the flow of fluid through each bypass being controlled by one of said valve means, and a cross-over control means for selectively operating both of said pairs of brakes from a single one of said generating means.

4. In a brake system for vehicles having sets of front and rear wheel brakes, a main block having dual fluid pressure generating means positioned in a lower portion thereof, a fluid reservoir in said block mounted over said generating means, a passage leading from each of said pressure generating means for communication with separate sets of brakes, a bypass means providing communication between said reservoir and each of said passages, valve means positioned in each of said passages and their respective bypass means controlling the flow of fluid therethrough, and a cross-over passage in said block providing communication between each of said passages, and control means positioned in said cross-over passage for controlling the flow of fluid therethrough so that both said sets of brakes may be operated from a single one of said pressure generating means.

ROY BLAFIELD.

REFERENCES CITED

The following references are of record in the file of this patent:

UNITED STATES PATENTS

| Number | Name | Date |
| --- | --- | --- |
| 1,606,224 | Hoeller | Nov. 9, 1926 |
| 1,695,194 | Lansinger | Dec. 11, 1928 |
| 1,978,669 | Carroll | Oct. 30, 1934 |
| 2,074,718 | Bohannan | Mar. 23, 1937 |
| 2,246,814 | Rehm | June 24, 1941 |
| 2,332,301 | Cox | Oct. 19, 1943 |